United States Patent
Yamamoto et al.

(10) Patent No.: US 12,503,120 B2
(45) Date of Patent: Dec. 23, 2025

(54) VEHICLE

(71) Applicant: SUBARU CORPORATION, Tokyo (JP)

(72) Inventors: Takahiro Yamamoto, Tokyo (JP); Kiyofumi Sato, Tokyo (JP); Kyohei Yamamoto, Tokyo (JP); Yuichi Suzuki, Tokyo (JP); Hideto Fukuda, Tokyo (JP); Naonori Ikezawa, Tokyo (JP); Hironao Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 197 days.

(21) Appl. No.: 18/225,830

(22) Filed: Jul. 25, 2023

(65) Prior Publication Data
US 2024/0043014 A1 Feb. 8, 2024

(30) Foreign Application Priority Data

Aug. 4, 2022 (JP) .................. 2022-124786

(51) Int. Cl.
*B60W 40/09* (2012.01)
*B60W 40/10* (2012.01)

(52) U.S. Cl.
CPC ............ *B60W 40/09* (2013.01); *B60W 40/10* (2013.01); *B60W 2710/0666* (2013.01); *B60W 2710/083* (2013.01)

(58) Field of Classification Search
CPC ............... B60W 40/09; B60W 40/10; B60W 2710/0666; B60W 2710/083; G09B 9/042
See application file for complete search history.

(56) References Cited

U.S. PATENT DOCUMENTS

| | | | |
|---|---|---|---|
| 2015/0187224 A1* | 7/2015 | Moncrief | G09B 9/052 434/30 |
| 2019/0213885 A1* | 7/2019 | Hanada | B60R 21/00 |
| 2019/0337513 A1* | 11/2019 | Kim | B60W 30/12 |
| 2020/0287497 A1* | 9/2020 | Nagata | G06N 3/08 |
| 2022/0097728 A1* | 3/2022 | Lin | G06N 20/00 |

FOREIGN PATENT DOCUMENTS

JP    2008-139553 A    6/2008

OTHER PUBLICATIONS

MIT News, "Explained: Sigma" (Year: 2012).*

* cited by examiner

*Primary Examiner* — Aniss Chad
*Assistant Examiner* — Stephanie T Su
(74) *Attorney, Agent, or Firm* — TROUTMAN PEPPER LOCKE LLP

(57) ABSTRACT

A vehicle includes one or more processors, and one or more memories coupled to the one or more processors. The one or more processors cooperate with a program included in the one or more memories to execute a process, the process including: obtaining numerical values related to multiple factors in actual driving prior to an execution of virtual driving not involving actual vehicle movement, and forming a population; detecting the execution of the virtual driving; and determining abnormal driving based on a distance from a center position of the population of the numerical values obtained in the actual driving after the execution of the virtual driving.

6 Claims, 5 Drawing Sheets

VEHICLE

CROSS-REFERENCE TO RELATED APPLICATION

The present application claims priority from Japanese Patent Application No. 2022-124786 filed on Aug. 4, 2022, the entire contents of which are hereby incorporated by reference.

BACKGROUND

The disclosure relates to vehicles.

Japanese Unexamined Patent Application Publication No. 2008-139553 discloses a driving simulator system configured to determine the driving suitability of a driver who drives a vehicle and who faces a traveling image, based on the driver's accelerator operation, brake operation, and steering wheel operation.

SUMMARY

An aspect of the disclosure provides a vehicle. The includes one or more processors and one or more memories coupled to the one or more processors. The one or more processors cooperate with a program included in the one or more memories to execute a process. The process includes: obtaining numerical values related to multiple factors in actual driving prior to an execution of virtual driving not involving actual vehicle movement, and forming a population; detecting the execution of the virtual driving; and determining abnormal driving based on a distance from a center position of the population of the numerical values obtained in the actual driving after the execution of the virtual driving.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

There has been a problem that, if actual driving is performed after driving in a virtual space of e-sport, a driving simulator, or the like, the driving would become rough due to the influence of driving in the virtual space, and the safety of vehicle driving would be reduced.

It is desirable to provide a vehicle capable of suppressing the reduction of the safety of vehicle driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
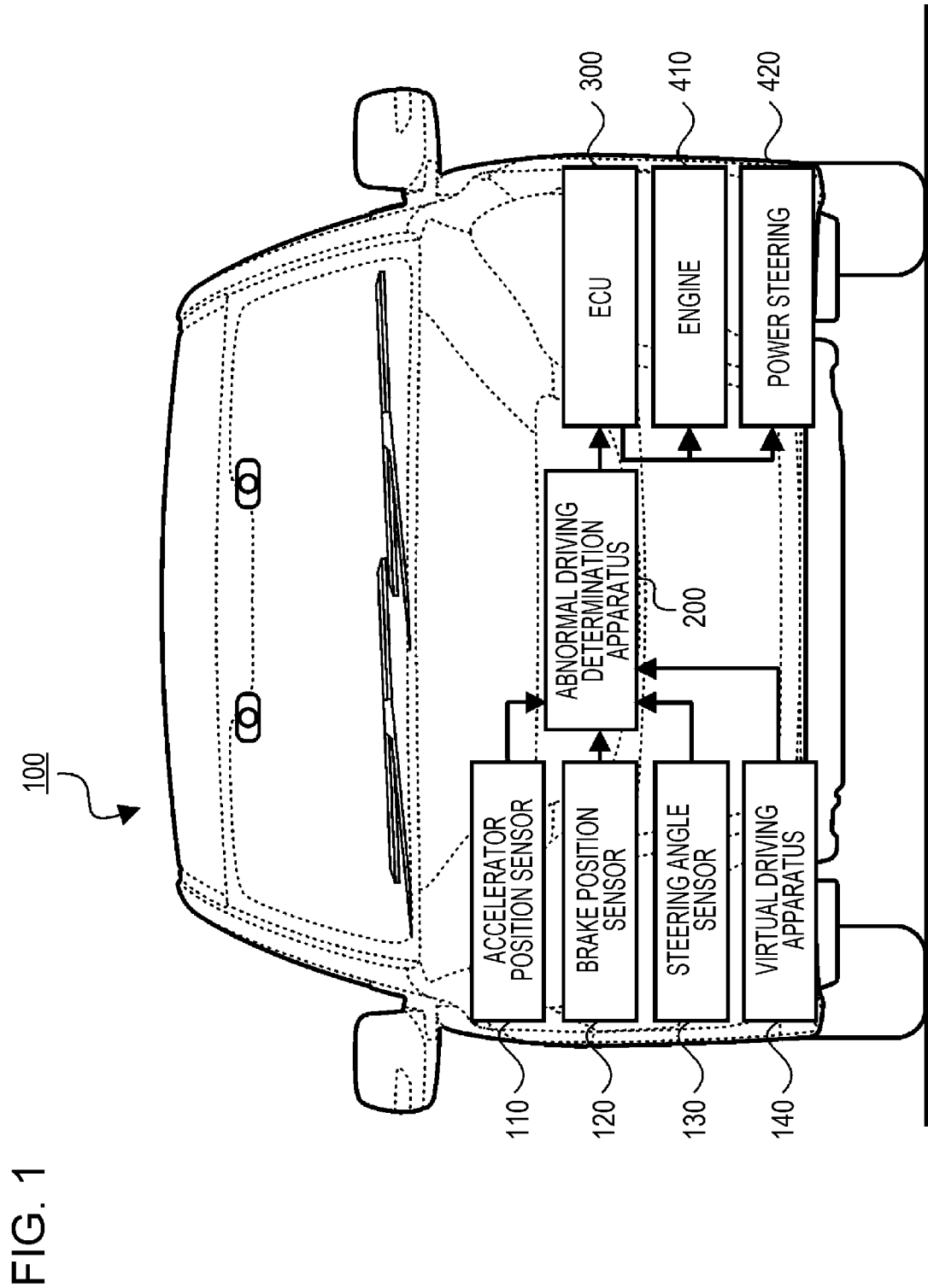
FIG. 1 is a schematic configuration diagram illustrating the configuration of a vehicle according to an embodiment.

FIG. 1 is a schematic configuration diagram illustrating the configuration of a vehicle 100 according to the present embodiment. The vehicle 100 is an engine vehicle, an electric vehicle, a hybrid vehicle, or the like. As illustrated in FIG. 1, the vehicle 100 includes an accelerator position sensor 110, a brake position sensor 120, a steering angle sensor 130, a virtual driving apparatus 140, an abnormal driving determination apparatus 200, an electronic control unit (ECU) 300, an engine 410, and a power steering 420.

The accelerator position sensor (accelerator operation amount sensor) 110 detects an accelerator operation amount, which is the operation amount of an accelerator pedal 146 (see FIG. 2), and sends the detected signal to the abnormal driving determination apparatus 200. The brake position sensor (brake operation amount sensor) 120 detects a brake operation amount, which is the operation amount of a brake pedal 148 (see FIG. 2), and sends the detected signal to the abnormal driving determination apparatus 200. The steering angle sensor 130 detects the angle of a steering wheel 144 (see FIG. 2), and sends the detected signal to the abnormal driving determination apparatus 200.

In this manner, the accelerator position sensor 110, the brake position sensor 120, and the steering angle sensor 130 send information related to the accelerator operation amount, the brake operation amount, and the angle of the steering wheel 144, respectively, to the abnormal driving determination apparatus 200.

The virtual driving apparatus 140 is a so-called driving simulator configured to simulate the driving and traveling of an automobile. Although an independent dedicated controller may be used to operate the virtual driving apparatus 140, an example of using the operation system of the vehicle 100 as-is will be described below. By activating and executing the virtual driving apparatus 140, a driver who drives the vehicle 100 can perform driving in a virtual space not involving the actual vehicle movement (hereinafter referred to as virtual driving). When virtual driving is started, the virtual driving apparatus 140 sends a signal indicating that virtual driving has started to the abnormal driving determination apparatus 200. When virtual driving is ended, the virtual driving apparatus 140 sends a signal indicating that virtual driving has ended to the abnormal driving determination apparatus 200. In this manner, the virtual driving apparatus 140 sends information related to the execution of virtual driving to the abnormal driving determination apparatus 200.

The abnormal driving determination apparatus 200 determines the driver's abnormal driving of the vehicle 100 based on signals obtained from the accelerator position sensor 110, the brake position sensor 120, the steering angle sensor 130, and the virtual driving apparatus 140. The abnormal driving determination apparatus 200 will be described in detail later.

In addition, when it is determined that abnormal driving has occurred, the abnormal driving determination apparatus 200 sends a signal indicating abnormal driving to the ECU 300.

The ECU 300 controls various apparatuses including the engine 410 mounted on the vehicle 100, and the power steering 420. In one embodiment, the engine 410 may serve as a "driving source". The ECU 300 also controls a motor a transmission, and so forth. In one embodiment, the motor may serve as a "driving source" of the vehicle 100.

On receipt of a signal indicating abnormal driving from the abnormal driving determination apparatus 200, the ECU 300 corrects the control amounts for the speed and torque of the engine 410 or the motor. In one example, the ECU 300 performs control of suppressing the speed and torque of the engine 410 or the motor. Moreover, on receipt of a signal indicating abnormal driving from the abnormal driving determination apparatus 200, the ECU 300 controls the power steering 420 so that the operation of the steering wheel 144 will be heavy.

Figure 2:
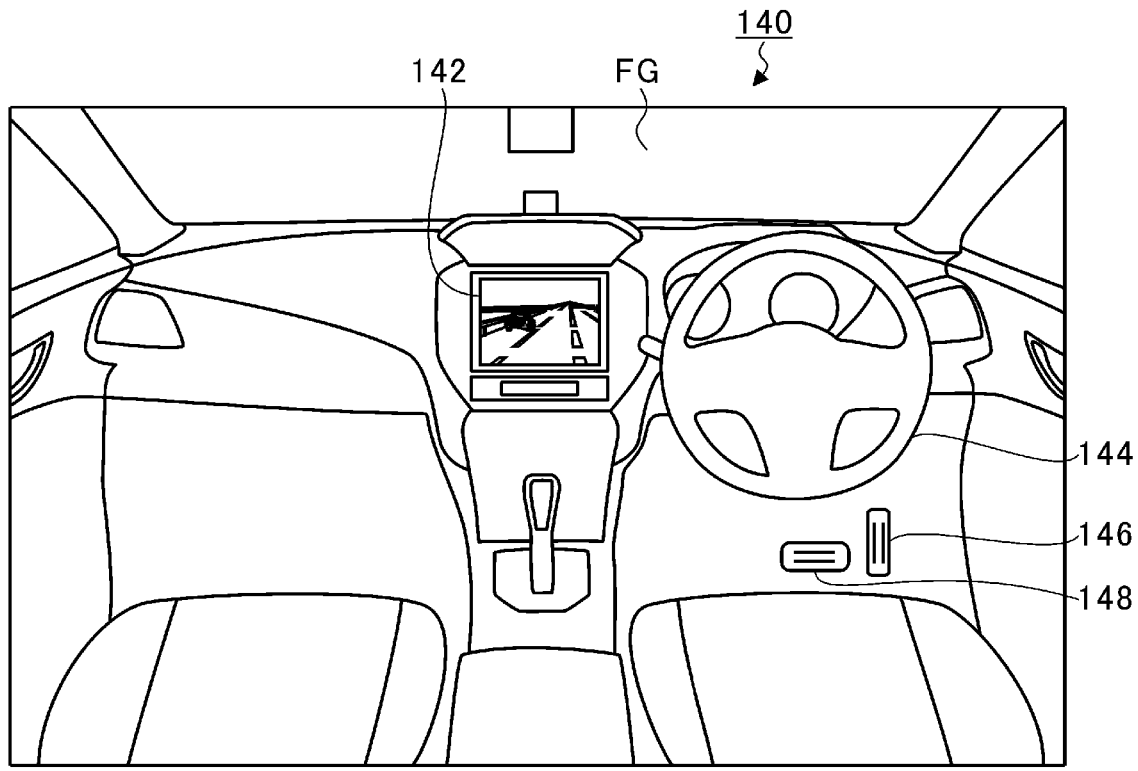
FIG. 2 is a schematic configuration diagram illustrating the configuration of a virtual driving apparatus according to the present embodiment.

FIG. 2 is a schematic configuration diagram illustrating the configuration of the virtual driving apparatus 140 according to the present embodiment. As illustrated in FIG. 2, the virtual driving apparatus 140 includes a display 142, the steering wheel 144, the accelerator pedal 146, and the brake pedal 148.

The display 142 is disposed, for example, between the driver's seat and the front occupant's seat in the instrumental panel. In the present embodiment, the display 142 is a display of a navigation system mounted on the vehicle 100. However, this is not the only possible type, and the display 142 may be composed of a liquid crystal panel provided on a windshield FG of the vehicle 100.

The display 142 is composed of a touchscreen, and the driver can start the execution of virtual driving that simulates the vehicle driving and traveling by tapping a start operation portion displayed on the display 142. Moreover, the driver can also operate the vehicle in a virtual space by operating the steering wheel 144, the accelerator pedal 146, and the brake pedal 148 provided in the real vehicle 100 while looking at the display 142.

By the way, when the driver drives the actual vehicle 100 (hereinafter referred to as actual driving) after virtual driving, the operation in the actual driving would become rough due to the influence of virtual driving, and the safety of vehicle driving may be reduced. Accordingly, the vehicle 100 according to the present embodiment includes the abnormal driving determination apparatus 200 in order to suppress the reduction of the safety of vehicle driving.

Figure 3:
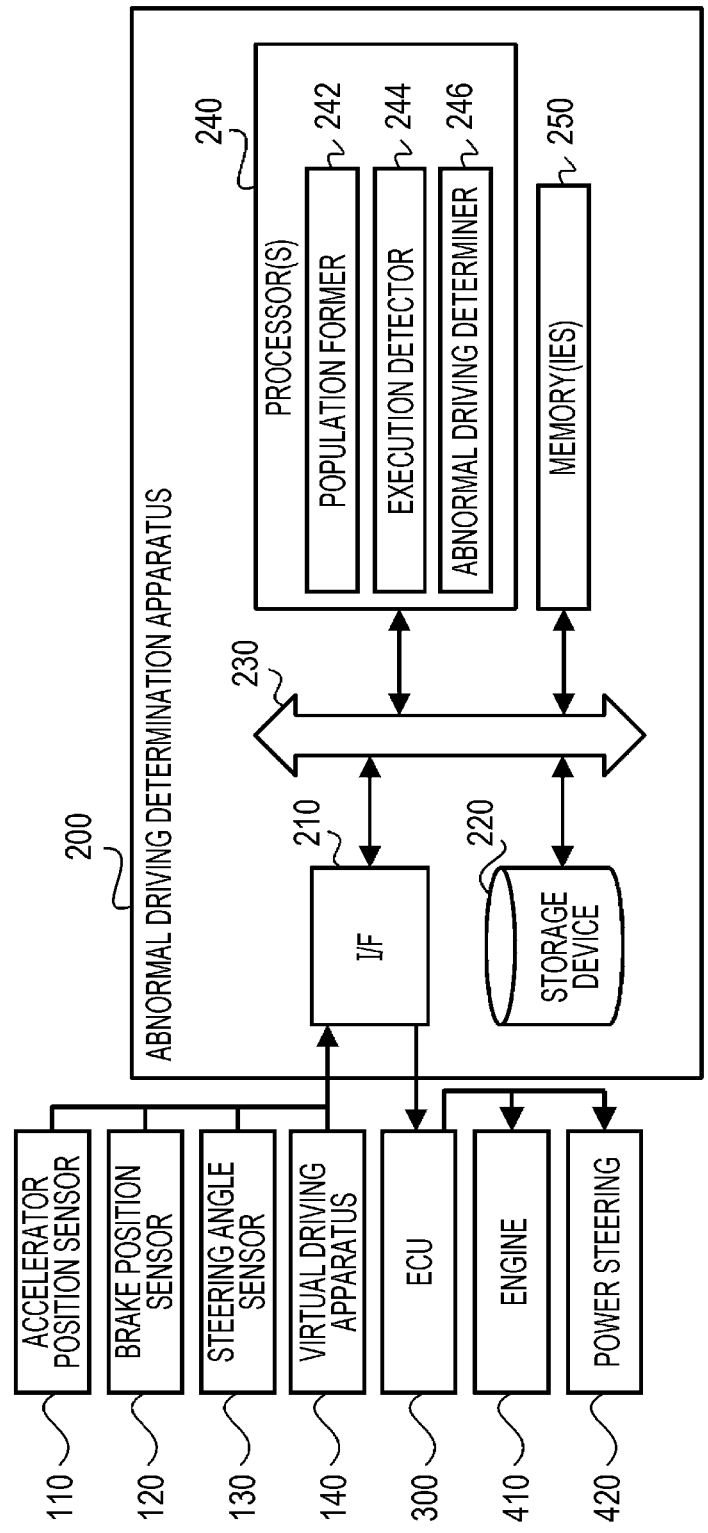
FIG. 3 is a functional block diagram illustrating the schematic functions of an abnormal driving determination apparatus.

FIG. 3 is a functional block diagram illustrating the schematic functions of the abnormal driving determination apparatus 200. As illustrated in FIG. 3, the abnormal driving determination apparatus 200 includes an interface (I/F) unit 210, a storage device 220, a system bus 230, one or more processors 240, and one or more memories 250.

Although the present embodiment illustrates an example in which the abnormal driving determination apparatus 200 and the ECU 300 are configured separately, the present embodiment is not limited thereto, and the abnormal driving determination apparatus 200 and the ECU 300 may be configured as one unit. In short, the ECU 300 may be included in the abnormal driving determination apparatus 200.

The I/F unit 210 is an interface for communicating with the accelerator position sensor 110, the brake position sensor 120, the steering angle sensor 130, and the ECU 300. The storage device 220 is composed of random-access memory (RAM), flash memory, a hard disk drive (HDD), etc., and maintains various types of information necessary for determining the driver's abnormal driving described later.

The system bus 230 couples the I/F unit 210, the storage device 220, the processor(s) 240, and the memory(ies) 250. The processor(s) 240 cooperate(s) with a program included in the memory(ies) 250 to control the I/F unit 210 and the storage device 220 through the system bus 230.

The memory(ies) 250 is/are composed of ROM, etc., and stores a program for operating the processor(s) 240. In addition, the processor(s) 240 cooperate(s) with a program included in the memory(ies) 250 to function as function modules such as a population former 242, an execution detector 244, and an abnormal driving determiner 246.

The population former 242 obtains signals output from the accelerator position sensor 110, the brake position sensor 120, and the steering angle sensor 130. These signals are obtained as multiple factors that cause the operation in actual driving to be rough due to the influence of virtual driving.

The population former 242 derives a rate of change of the accelerator operation amount based on a signal obtained from the accelerator position sensor 110. Then, the population former 242 accumulates the derived rate of change of the accelerator operation amount to form a population that is the entire set of rates of change of the accelerator operation amount.

In addition, the population former 242 derives a rate of change of the brake operation amount based on a signal obtained from the brake position sensor 120. Then, the population former 242 accumulates the derived rate of change of the brake operation amount to form a population that is the entire set of rates of change of the brake operation amount.

Similarly, the population former 242 derives a rate of change of the steering angle based on a signal obtained from the steering angle sensor 130. Then, the population former 242 accumulates the derived rate of change of the steering angle to form a population that is the entire set of rates of change of the steering angle. Hereinafter, the rate of change of the accelerator operation amount, the rate of change of the brake operation amount, and the rate of change of the steering angle are collectively and simply referred to as numerical values.

The formation of such populations is performed during actual driving prior to virtual driving, and during actual driving after a certain period of time has elapsed after virtual driving. In short, the population former 242 here forms a population of numerical values related to multiple factors in actual driving before being influenced by virtual driving, and in actual driving after the influence of virtual driving is reduced over time. Data of the formed population is stored in the storage device 220.

The execution detector 244 detects a state in which virtual driving is being executed by receiving, from the virtual driving apparatus 140, a signal indicating that virtual driving has started and a signal indicating that virtual driving has ended. In one example, the execution detector 244 detects a period from a time point at which a signal indicating that virtual driving has started to a time point at which a signal indicating that virtual driving has ended as an execution period during which virtual driving is executed.

The abnormal driving determiner 246 determines abnormal driving based on data of a population formed by the population former 242 prior to the execution of virtual driving, and numerical values related to multiple factors derived by the population former 242 after the execution of virtual driving.

In addition, the abnormal driving determiner 246 determines abnormal driving based on data of a population formed by the population former 242 after a certain period of time has elapsed after the execution of virtual driving, and numerical values related to multiple factors derived again thereafter by the population former 242 after the execution of virtual driving. Here, data of a population formed after a certain period of time has elapsed after the execution of virtual driving is treated as data of a population formed by the population former 242 prior to the execution of virtual driving executed again thereafter.

Figure 4:
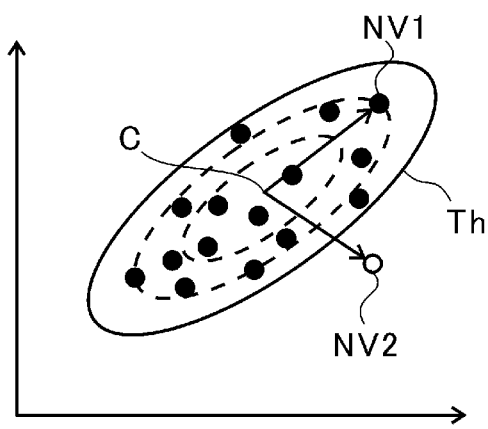
FIG. 4 is a diagram illustrating an example of data of a population.

FIG. 4 is a diagram illustrating an example of data of a population. In FIG. 4, the longitudinal axis indicates the rate of change of the accelerator operation amount and the horizontal axis indicates the rate of change of the steering angle at a certain rate of change of the brake operation amount.

Also in FIG. 4, a dashed and solid ellipse represents a contour line with an equal Mahalanobis distance from a center position C, which is the mean value of the population. In FIG. 4, black circle dots indicate the numerical values of a population formed by the population former 242 prior to the execution of virtual driving, or after a certain period of time has elapsed after the execution of virtual driving.

Here, the black circle points indicate a population of numerical values that are related to multiple factors derived prior to virtual driving or after a certain period of time has elapsed after virtual driving, and that are accumulated as normal values that are not influenced by virtual driving. Also, a white circle point indicates numerical values related to multiple factors derived within a certain period of time after virtual driving. Here, the white circle point indicates the numerical values of abnormal values where the operation in the actual driving has become rough due to the influence of virtual driving.

In FIG. 4, numerical value NV1 indicated by a black circle point and numerical value NV2 indicated by a white circle point are two points with an equal Euclidean distance from the center position C of the population. Therefore, in Euclidean distance, the distance from the center position C of the population is equal between numerical value NV1 indicated by a black circle point and numerical value NV2 indicated by a white circle point, and it is thus difficult to distinguish numerical value NV2 indicated by a white circle point as an abnormal value.

In contrast, in Mahalanobis distance, which is the distance from the center position C of the population considering the correlation of multiple numerical values, the distance from the center position C of the population is different between numerical value NV1 indicated by a black circle point and numerical value NV2 indicated by a white circle point. In one example, numerical value NV1 is a numerical value less than a threshold Th in Mahalanobis distance, and numerical value NV2 is a numerical value greater than or equal to the threshold Th in Mahalanobis distance. In this manner, by deriving the Mahalanobis distance of numerical values related to multiple factors, the population, which is a group of normal values, and an abnormal value can be distinguished.

In the present embodiment, a threshold Th for the Mahalanobis distance from the center position C of the population formed by the population former 242 is set, and a numerical value less than the threshold Th is determined to be a normal value before being influenced by virtual driving. In contrast, a numerical value greater than or equal to the threshold Th is determined to be an abnormal value deviating from the population due to the influence of virtual driving. The threshold Th used here is appropriately set in advance as a threshold for determining abnormal driving based on the Mahalanobis distance considering the variance of a sample population obtained in advance through experiments as illustrated in FIG. 4. In the present embodiment, multiple types of sample populations are obtained in advance through experiments, and a threshold Th is set in advance for each sample population in accordance with its variance. Here, the thresholds Th set for the multiple types of sample populations are each a different value. Note that this is not the only possible case, and some of the thresholds Th set for the multiple types of sample populations may be the same value.

Multiple types of sample populations obtained in advance through experiments and thresholds Th are stored in advance in the storage device 220. The storage device 220 stores multiple sample populations obtained in advance through experiments. Also, a threshold Th associated with each sample population is stored in the storage device 220 in association with the multiple sample populations.

Among the multiple sample populations stored in the storage device 220, the abnormal driving determiner 246 extracts a sample population that approximates a population formed by the population former 242, and obtains a threshold Th associated with the sample population.

The abnormal driving determiner 246 derives a Mahalanobis distance from the center position C of the population of numerical values derived by the population former 242 after virtual driving has been executed, and compares the Mahalanobis distance with the obtained threshold Th.

If the derived Mahalanobis distance is less than the threshold Th, the abnormal driving determiner 246 determines numerical values derived by the population former 242 after virtual driving has been executed as normal values, and determines that the driver's driving of the vehicle 100 after virtual driving as normal driving.

In contrast, if the derived Mahalanobis distance is greater than or equal to the threshold Th, the abnormal driving determiner 246 determines numerical values derived by the population former 242 after virtual driving has been executed as abnormal values, and determines that the driver's driving of the vehicle 100 after virtual driving as abnormal driving.

In this manner, the abnormal driving determiner 246 determines abnormal driving based on numerical values obtained in actual driving after virtual driving, and the Mahalanobis distance. When abnormal driving is determined, the abnormal driving determiner 246 sends information indicating abnormal driving to the ECU 300.

On receipt of information indicating abnormal driving, the ECU 300 controls the engine 410 so that the torque of the engine 410 will be less than a certain value. In addition, on receipt of information indicating abnormal driving, the ECU 300 controls the power steering 420 so that the operation of the steering wheel 144 will be heavy. In this manner, the ECU 300 functions as a correction unit configured to correct the control amounts for the torque of the driving source and the steering of the vehicle 100.

Figure 5:
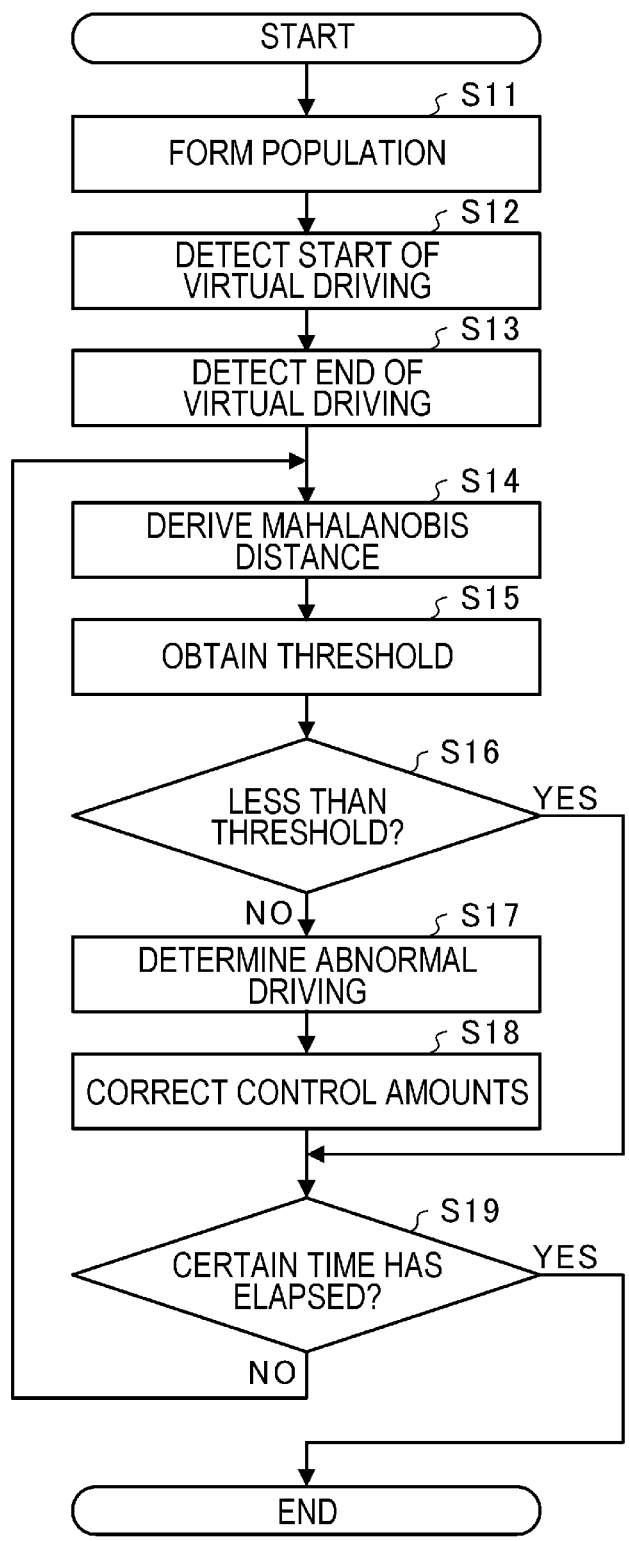
FIG. 5 is a flowchart of an abnormal driving determination process according to the present embodiment.

FIG. 5 is a flowchart of an abnormal driving determination process according to the present embodiment. As illustrated in FIG. 5, first, the population former 242 obtains signals output from the accelerator position sensor 110, the brake position sensor 120, and the steering angle sensor 130.

Next, the population former 242 derives the rate of change of the accelerator operation amount, the rate of change of the brake operation amount, and the rate of change of the steering angle based on the signals obtained from the accelerator position sensor 110, the brake position sensor 120, and the steering angle sensor 130. Then, the population former 242 forms a population by accumulating the numerical values of the derived rate of change of the accelerator operation amount, rate of change of brake operation amount, and rate of change of the steering angle (S11).

By receiving a signal from the virtual driving apparatus 140 indicating that virtual driving has started, the execution detector 244 detects that the execution of virtual driving has started (S12). By receiving a signal from the virtual driving apparatus 140 indicating that virtual driving has ended, the execution detector 244 detects that the execution of virtual driving has ended (S13).

The abnormal driving determiner 246 derives the Mahalanobis distance of numerical values of the rate of change of the accelerator operation amount, the rate of change of the brake operation amount, and the rate of change of the steering angle derived by the population former 242 after virtual driving in S13 (S14). Then, among multiple sample populations stored in the storage device 220, the abnormal driving determiner 246 extracts a sample population that approximates the population formed in S11, and obtains a threshold Th associated with the sample population (S15).

The abnormal driving determiner 246 compares the Mahalanobis distance derived in S14 with the threshold Th obtained in S15, and determines whether the Mahalanobis distance is less than the threshold Th (S16). When the Mahalanobis distance is less than the threshold Th (YES in S16), the abnormal driving determiner 246 determines that numerical values derived by the population former 242 after virtual driving are normal values, determines that the driving of the vehicle 100 is normal driving, and moves to the processing in S19.

In contrast, when the Mahalanobis distance is greater than or equal to the threshold Th (NO in S16), the abnormal driving determiner 246 determines that numerical values derived by the population former 242 after virtual driving are abnormal values, and determines that the driving of the vehicle 100 is abnormal driving (S17). At this time, the abnormal driving determiner 246 sends information indicating abnormal driving to the ECU 300.

On receipt of information indicating abnormal driving, the ECU 300 corrects the control amount for the engine 410 so that the torque of the engine 410 will be less than a certain value. In addition, on receipt of information indicating abnormal driving, the ECU 300 corrects the control amount for the power steering 420 so that the operation of the steering wheel 144 will be heavy (S18).

After YES in S16 or the processing in S18, the abnormal driving determiner 246 determines whether a certain period of time has elapsed since the end of virtual driving in S13 (S19). When it is determined that the certain period of time has not elapsed (NO in S19), the abnormal driving determiner 246 repeatedly executes the processing in S14 to S19. In contrast, when it is determined that the certain period of time has elapsed (YES in S19), the abnormal driving determiner 246 ends the abnormal driving determination process.

As described thus far, in the present embodiment, numerical values related to multiple factors obtained prior to virtual driving are formed as a population that is a group of normal values, and the Mahalanobis distance of numerical values related to the multiple factors obtained after virtual driving is derived. Then, comparison of the Mahalanobis distance and the preset threshold Th makes it possible to determine the driver's abnormal driving. As a result, the reduction of the safety of vehicle driving can be suppressed.

In the present embodiment, when abnormal driving is determined, the control amounts for the torque of the driving source and the steering of the vehicle 100 are corrected. Therefore, even if the operation in actual driving becomes rough due to the influence of virtual driving, the reduction of the safety of vehicle driving can be suppressed.

Furthermore, in the present embodiment, among multiple sample populations provided in advance, a sample population that approximates a population of numerical values related to multiple factors obtained prior to virtual driving is extracted, and a threshold associated with the sample population is derived. This makes it possible to enhance the accuracy of determining abnormal driving.

Although the embodiment of the disclosure has been described above with reference to the accompanying drawings, needless to say, the disclosure is not limited to the embodiment. It is clear to those skilled in the art to be able to conceive of various changes or modifications within the scope described in the claims, and it is understood that they also naturally fall within the technical scope of the disclosure.

In the above-described embodiment, an example in which the ECU 300 corrects the control amounts for the torque of the engine 410 and the steering by the power steering 420 has been described. However, this is not the only possible case, and the ECU 300 need not correct the control amounts for the torque and the steering. For example, upon determination of abnormal driving, the abnormal driving determination apparatus 200 may report a warning on the instrumental panel of the vehicle 100.

In the above-described embodiment, an example in which a threshold Th is extracted from multiple sample populations has been described. However, this is not the only possible case, and the threshold Th may be a certain single value as well.

According to the disclosure, the reduction of the safety of vehicle driving can be suppressed.

The abnormal driving determination apparatus 200 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the abnormal driving determination apparatus 200 including the population former 242, the execution detector 244, and the abnormal driving determiner 246. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:
1. A vehicle comprising:
one or more processors; and
one or more memories coupled to the one or more processors, the one or more processors cooperating with a program included in the one or more memories to execute a process, the process including:
  obtaining, from at least one of an accelerator position sensor, a brake position sensor, or a steering angle sensor, a first set of signals indicating numerical values related to multiple factors in actual driving prior to an execution of a virtual driving, and forming a population in the actual driving prior to the execution of the virtual driving,
  detecting the execution of the virtual driving,
  obtaining, from the at least one of the accelerator position sensor, the brake position sensor, or the steering angle sensor, a second set of signals indicating numerical values related to at least one of the multiple factors obtained in an actual driving after the execution of the virtual driving, and forming a post-virtual driving population,
  deriving a distance from a center position of the post-virtual driving population to a numerical value of the numerical values in the post-virtual driving population,
  determining an abnormal driving based on the derived distance and the population in the actual driving prior to the execution of the virtual driving; and
  generating a signal indicating the determined abnormal driving; and
  correcting at least one of (i) a control amount for torque of a driving source of the vehicle; or (ii) a control amount for steering of the vehicle.

2. The vehicle according to claim 1, wherein:
the distance is Mahalanobis distance; and
the one or more processors are configured to determine the abnormal driving by comparing the Mahalanobis distance and a threshold.

3. The vehicle according to claim 1, comprising:
  a storage device configured to store multiple sample populations provided in advance, and thresholds respectively associated with the sample populations,
  wherein the one or more processors are configured to determine the abnormal driving by extracting, among the multiple sample populations, a sample population that approximates the post-virtual driving population, and comparing the distance and a threshold of the thresholds that is associated with the extracted sample population.

4. The vehicle according to claim 3, wherein the process includes:
  in response to the distance being greater than or equal to the threshold associated with the extracted sample population, determining the numerical value as an abnormal value.

5. The vehicle according to claim 1, wherein forming the population in the actual driving prior to the execution of the virtual driving comprises:
  deriving at least one of a rate of change of an accelerator operation amount, a rate of change of a brake operation amount, and a rate of change of a steering angle based on the first set of signals obtained from the at least one of the accelerator position sensor, the brake position sensor, or the steering angle sensor, and
  forming the population by accumulating the numerical values of the derived at least one of the rate of change of the accelerator operation amount, the rate of change of the brake operation amount, or the rate of change of the steering angle.

6. The vehicle according to claim 1, the torque of the driving source of the vehicle is corrected to a value lower than a predetermined value.

* * * * *